United States Patent [19]

Kaminski et al.

[11] Patent Number: 4,764,019
[45] Date of Patent: Aug. 16, 1988

[54] METHOD AND APPARATUS FOR MIXING DRY PARTICULATE MATERIAL WITH A LIQUID

[75] Inventors: Donald R. Kaminski, Magnolia, Tex.; Burnie Sims, Scott, La.

[73] Assignee: Hughes Tool Company, Houston, Tex.

[21] Appl. No.: 91,797

[22] Filed: Sep. 1, 1987

[51] Int. Cl.⁴ .......................... B28C 5/00; B28C 7/00
[52] U.S. Cl. ...................................... 366/15; 366/17; 366/136; 366/142
[58] Field of Search ...................... 366/6, 8, 14, 15, 16, 366/17, 136, 137, 142, 152, 159, 160, 161, 162, 138, 141

[56] References Cited

U.S. PATENT DOCUMENTS

| | | |
|---|---|---|
| 3,256,181 | 6/1966 | Zingg .................................. 366/142 |
| 3,326,536 | 6/1967 | Zingg et al. . |
| 4,007,921 | 2/1977 | Zingg . |
| 4,239,396 | 12/1980 | Arribau et al. . |
| 4,322,168 | 3/1982 | Hartung et al. . |
| 4,339,202 | 7/1982 | Hart et al. . |
| 4,368,984 | 1/1983 | Rikker . |
| 4,403,863 | 9/1983 | Fukushima et al. . |
| 4,474,476 | 10/1984 | Thomsen .............................. 366/152 |
| 4,490,044 | 12/1984 | Saito .................................... 366/152 |
| 4,654,802 | 3/1987 | Davis ..................................... 366/17 |

Primary Examiner—Robert W. Jenkins
Attorney, Agent, or Firm—Charles D. Gunter, Jr.

[57] ABSTRACT

An apparatus and method for mixing dry particulate material and liquid is shown. The dry material is initially mixed in a mixing module. The pre-mixed slurry then passes to a two stage mixing tank system featuring a smaller, primary tank and a larger capacity, secondary tank. The premixed slurry passes into the primary tank for additional mixing, then flows over a weir into the secondary tank. A portion of the slurry in the secondary tank is recirculated to the mixing module while the density of the slurry in the primary is monitored. The overall slurry density is controlled by adjusting the dry material entering the mixing module based upon the density reading taken from the primary tank.

8 Claims, 1 Drawing Sheet

METHOD AND APPARATUS FOR MIXING DRY PARTICULATE MATERIAL WITH A LIQUID

BACKGROUND OF THE INVENTION

1. Field of the Invention The present invention relates generally to an improved method and apparatus for mixing dry particulate materials with a liquid and, specifically to an apparatus and method for mixing dry cement with water to form a well cementing slurry.

2. Description of the Prior Art

Many different types of chemical processes and other industries require mixing dry particulate materials with liquid to produce a working fluid or slurry product. For instance, well casings penetrating subterranean formations are cemented with a slurry formed from dry cement and water. Typical prior art well cementing systems have featured mixing modules, some of which have included vortex type mixers. In one type vortex mixer, the cement particles are directed downwardly through a vertical pipe section which opens into a pump volute casing. As the cement drops into the volute casing, it is contacted by water, the water being directed downwardly through an outer pipe section which encloses the "cement" pipe and which also opens into the volute casing.

U.S. Pat. No. 4,007,921, issued Feb. 15, 1977, to Zingg, describes a prior art mixing device in which the volute casing and lower end of the concentric pipe sections are supported inside a holding tank. As the slurry mixture leaves the pump volute, it is contained within the holding tank. From the holding tank, part of the slurry is continuously recycled through a densimeter and a recycling pump and back through the pump volute. At the same time, the remaining part of the slurry is directed from the recycling pump to a high pressure cement pump and into the well bore.

Although systems of the type described have been used successfully in well cementing operations, a need exists for a mixing apparatus and method which allows greater control over slurry density than was achieved in the past.

A need exists for such a system which will continuously average the slurry density to produce a more uniform slurry for improved well cementing operations.

SUMMARY OF THE INVENTION

In the method of the invention, dry particulate material, such as dry cement, is initially mixed with a stream of liquid in a mixing bowl to form a slurry. The slurry is passed through a conduit to a primary tank for additional mixing. A portion of the slurry contained in the primary tank is recirculated through a recirculating loop to further mix the slurry in the primary tank. A portion of the slurry in the primary is passed from the primary tank to a larger capacity, secondary tank. A portion of the slurry contained in the secondary tank is passed out a discharge conduit. A portion of the slurry contained in the secondary tank is recirculated to the mixing bowl where it combines with the stream of liquid and dry particulate material entering the mixing bowl. The density of the slurry contained in the primary tank is measured and the desired density is attained in the slurry passing out the discharge conduit by continuing to recirculate slurry from the secondary tank to the mixing bowl while adjusting the entering flow of dry particulate material and liquid entering the mixing bowl based upon the density measurement taken from the primary tank.

The preferred apparatus used in practicing the method of the invention includes a mixing module including a cement hopper, a mixing bowl, and an inlet stream of pressurized water for initially mixing cement discharged from the hopper into the mixing bowl to form a cement slurry. A primary tank is connected to the mixing module by a conduit whereby slurry from the mixing module passes to the primary tank, the primary tank being equipped with a spillway which allows overflow into a larger capacity, secondary tank. A first recirculating loop connected to the primary tank includes a recirculating pump for recirculating a portion of the slurry contained in the primary tank through the loop and back to the primary tank under pressure to further mix the slurry in the primary tank. A discharge conduit leads from the secondary tank to a high pressure pump and from the high pressure pump to the well bore.

A vertical auger is mounted in the secondary tank for agitating the slurry contained in the secondary tank to reduce air entrainment and further mix the slurry. A second recirculating loop connects the secondary tank to the mixing module and includes a pump for recirculating a portion of the slurry contained in the secondary tank to the mixing module where it combines with the stream of water and cement entering the mixing module. A densimeter is located in the first recirculating loop for measuring the density of the slurry contained in the primary tank by reading the density of the slurry passing through the first recirculating loop. The desired density is attained in the discharge slurry by continuing to recirculate slurry from the secondary tank to the mixing bowl while adjusting the entering flow of dry cement and liquid entering the mixing bowl based upon the density measurement taken off the primary tank.

Additional objects, features and advantages will be apparent in the written description which follows.

DESCRIPTION OF THE PREFERRED EMBODIMENT

Figure 1:
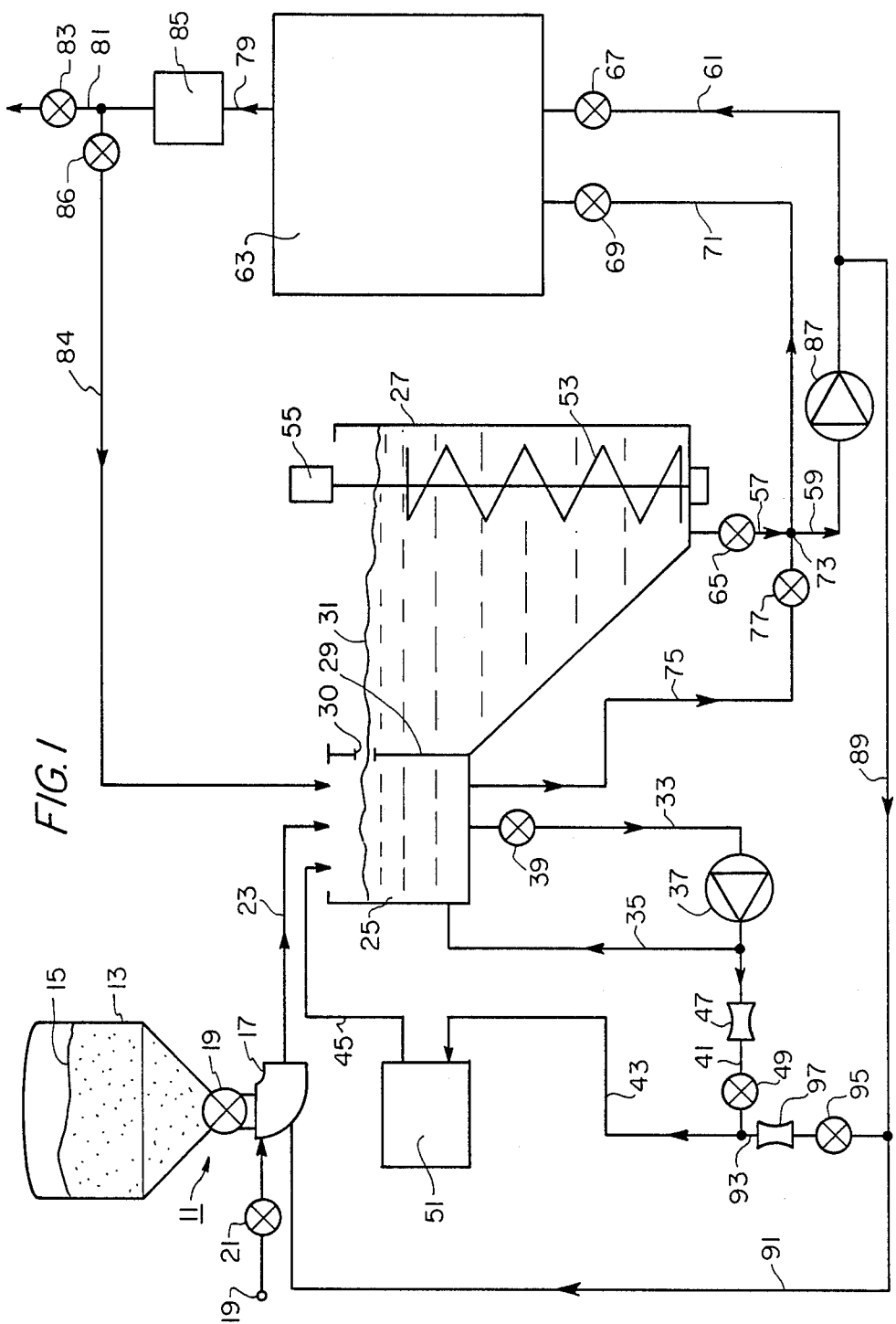
FIG. 1 is a schematic of the system for mixing dry particulate material with a liquid illustrating the preferred method of practicing the invention.

FIG. 1 is a schematic illustrating the apparatus and method of the invention, including a mixing module, designated generally as 11. The mixing module 11 includes a means for storing a charge of dry particulate material, such as hopper 13 having dry cement 15. The hopper 13 is connected to a mixing bowl 17 through a regulating valve, such as gate valve 19. The mixing bowl also has an inlet stream 19 of pressurized liquid, such as water, the flow rate of which is controlled by valve 21. Mixing modules of the type shown are known in the art and are shown, for instance, in U.S. Pat. No. 4,007,921, issued Feb. 15, 1977, to Zingg. Mixing modules of the same general type are shown, e.g., in U.S. Pat. Nos. 4,239,396, issued Dec. 16, 1980, to Arribau, et. al., and 3,326,536, issued June 20, 1967, to Zingg, et. al. The liquid stream 19 is typically axially directed through an inlet to the mixing bowl in outer concentric relation to the solids inlet from the hopper. The liquid flow through the mixing bowl acts as an inductor to create a partial vacuum and draw dry cement into the mixing bowl. The volume of dry cement introduced into the system can thus be controlled by varying the position of gate valve 19, the liquid flow rate entering from stream 19 preferably remaining constant.

The liquid slurry leaving the mixing bowl 17 passes out conduit 23 to a primary four barrel tank 25. The primary tank 25 is connected to a larger capacity, twenty barrel secondary tank 27 by means of common wall 29. Common wall 29 is provided with a weir 30 to allow overflow of liquid slurry from the primary tank 25 to the secondary tank 27. The weir can constitute a notch or spillway provided in the upper region of the common wall 29.

A first recirculating loop including conduit legs 33, 35 and recirculating centrifugal pump 37 is connected to the primary tank 25 for recirculating a portion of the slurry contained in the primary tank 25 through the loop and back to the primary tank under pressure to further mix the slurry in the primary tank. A valve 39 controls the discharge from the primary tank 25.

A further portion of the first recirculating loop includes legs 41, 43 and 45. An orifice 47 restricts flow through leg 41 and valve 49 can be used to further regulate the flow. The purpose of orifice 47 is to cause the bulk of the fluid slurry to be recirculated through leg 35 to the primary tank 25. A "U-tube" type densimeter 51 is provided in leg 43 to measure the density of the slurry being recirculated to the primary tank 25, the slurry being at low pressure, typically below about 100 psi. Densimeters are known in the art and are commercially available. See, e.g., U.S. Pat. No. 4,007,921, issued Feb. 15, 1977, to Zingg.

The secondary tank 27 is provided with a vertically arranged, variable speed agitator or auger 53 powered by motor 55. The agitator is commercially available from BJ-Titan of Tomball, Tex., and is used to lift the slurry for further mixing and to reduce air entrainment in the slurry.

A discharge conduit including legs 57, 59 and 61 leads from the secondary tank 27 to a high pressure cement pump unit, such as triplex pumps 63. Valves 65 and 67 control the flow of slurry to the pumps 63. A valve 69 also controls the flow of slurry from the secondary tank 27 by way of a T-connection 73 and conduit leg 71. The T-connection also receives flow from a conduit 75 leading from the primary tank 25, the flow in conduit 75 being controlled by a valve 77.

The discharge conduit also includes legs 79, 81 leading from the high pressure pumps 63 and valve 83. A nuclear densimeter 85 is provided in the conduit leg 79 for reading and recording the resultant slurry viscosity in the high pressure discharge leading to the well bore. Nuclear densimeters are known in the art and are commercially available from BJ-Titan, Tomball, Tex. Such devices clamp onto the discharge conduit 79 and include a radioactive source of gamma rays which are attenuated in proportion to the density of the slurry in the conduit 79. An electrical signal is generated by the gamma rays which is in proportion to the attenuation thereof. The signal can be fed, e.g., to a strip recorder which is calibrated to give a visual reading of the density according to the signal strength.

A leg 84 off the discharge conduit 79 along with valve 86 can be used to recirculate a portion of the discharge slurry to the primary tank 25.

Conduit legs 57, 59 and recirculating centrifugal pump 87 along with conduit legs 89 and 91 form part of a second recirculating loop connecting the secondary tank 27 with the mixing module for recirculating a portion of the slurry contained in the secondary tank 27 to the mixing bowl 17, where it mixes with the dry cement and water entering the system. Conduit leg 93, along with valve 95, also allow a portion of the slurry in leg 89 to flow through the densimeter 51 for further averaging the density reading, if desired. An orifice 97 normally restricts the flow of slurry upwardly through the leg 93 so that the majority of the slurry is recirculated through leg 91.

The operation of the mixing system will now be described. Water is first introduced to the mixing bowl 17 through the inlet stream 19 and the rate is set by valve 21. The hopper 13 is filled with cement and mixing is begun in the primary tank 25. As the secondary tank 27 begins to fill with slurry, the agitator is turned on to further mix the slurry and slurry passes out the discharge to the well. The resultant slurry viscosity is adjusted by reading the viscosity of the slurry in the first recirculating loop by means of densimeter 51. The desired viscosity is attained by continuing to recirculate slurry from the secondary tank 27 through the legs 59, 89, and 91 to the mixing bowl 17 while adjusting the entering flow of dry cement entering through the gate valve 19, the water flow rate preferably being held constant from inlet 19.

The density of the resultant slurry is adjusted as follows: If the density reading from densimeter 51 is too great, the gate valve is closed partially to restrict the flow of cement into the mixing bowl. If the density measured at densimeter 51 is too low, the gate valve 19 is opened further. The nuclear densimeter 85 is used only to record the resultant viscosity of the slurry being pumped into the well.

An invention has been provided with several advantages. The mixing system of the invention allows precision mixing and blending of cement and water for well cementing operations. The density reading taken from the primary tank allows accurate viscosity corrections since the freshest slurry is being sampled. The larger capacity secondary tank and its associated recirculating loop further mix the slurry and continuously recirculate the slurry until the desired density is attained and verified. The variable speed agitator in the secondary tank reduces air entrainment in the slurry and facilitates blending and averaging the density of the slurry. The larger capacity of the secondary tank also allows easier operator control and decreases the risk that an empty tank will recavitate the recirculating pump.

The invention has been shown in only one of its forms. It should be apparent to those skilled in the art that it is not so limited, but is susceptible to various changes and modifications without departing from the spirit thereof.

We claim:

1. A method for mixing dry particulate material with a liquid, comprising the steps of:
    initially mixing the dry particulate material with a stream of liquid in a mixing bowl to form a slurry;
    passing the slurry through a conduit to a primary tank for additional mixing;
    recirculating a portion of the slurry contained in the primary tank through a recirculating loop to further mix the slurry in the primary tank;
    passing a portion of the slurry from the primary tank to a larger capacity, secondary tank;
    passing a portion of the slurry contained in the secondary tank out a discharge conduit;

recirculating a portion of the slurry contained in the secondary tank to the mixing bowl where it combines with the stream of liquid and dry particulate material entering the mixing bowl;

measuring the density of the slurry contained in the primary tank; and attaining the desired density in the slurry passing out the discharge conduit by continuing to recirculate slurry from the secondary tank to the mixing bowl while adjusting the entering flow of dry particulate material and liquid entering the mixing bowl based upon the density measurement taken from the primary tank.

2. A method for mixing dry particulate material with a liquid, comprising the steps of:

introducing the dry particulate material from a hopper into a mixing bowl and introducing a stream of liquid into the bowl to initially mix the particulate material and the liquid and form a slurry;

passing the slurry through a conduit to a primary tank for additional mixing, the primary tank being equipped with a spillway which allows overflow into a larger capacity, secondary tank;

recirculating a portion of the slurry contained in the primary tank through a recirculating loop to further mix the slurry in the primary tank;

passing a portion of the slurry contained in the secondary tank out a discharge conduit;

recirculating a portion of the slurry contained in the secondary tank to the mixing bowl where it combines with the stream of liquid and dry particulate material entering the mixing bowl;

measuring the density of the slurry contained in the primary tank by reading the density of the slurry passing through the recirculating loop; and attaining the desired density in the slurry passing out the discharge conduit by continuing to recirculate slurry from the secondary tank to the mixing bowl while adjusting the entering flow of dry particulate material and liquid entering the mixing bowl based upon the density measurement taken from the primary tank.

3. The method of claim 2, further comprising the steps of:

agitating the slurry contained in the secondary tank with a vertical auger to reduce air entrainment and further mix the slurry.

4. The method of claim 2 further comprising the steps of:

installing a gate valve between the hopper and mixing bowl and adjusting the density of the slurry passing out the discharge conduit by metering the incoming flow of dry particulate material based upon the density reading in the primary tank while continuing to recirculate slurry from the secondary tank to the mixing bowl, the incoming flow of liquid to the mixing bowl remaining constant.

5. The method of claim 2, wherein the capacity of the secondary tank is at least twice that of the primary tank.

6. The method of claim 5, wherein the capacity of the secondary tank is approximately five times that of the primary tank.

7. A method for mixing dry cement and water to form a well cementing slurry, comprising the steps of:

introducing the cement from a hopper into a mixing bowl while introducing a pressurized stream of water into the bowl to initially mix the cement and water and form a cement slurry;

passing the slurry through a conduit to a primary tank for additional mixing, the primary tank being equipped with a spillway which allows overflow into a larger capacity, secondary tank;

recirculating a portion of the slurry contained in the primary tank through a recirculating loop and pumping the slurry back to the primary tank under pressure to further mix the slurry in the primary tank;

passing a portion of the slurry contained in the secondary tank out a discharge conduit to a high pressure pump and from the high pressure pump to the well bore;

agitating the slurry contained in the secondary tank with a vertical auger to reduce air entrainment and further mix the slurry;

recirculating a portion of the slurry contained in the secondary tank to the mixing bowl where it combines with the stream of water and cement entering the mixing bowl;

measuring the density of the slurry contained in the primary tank by reading the density of the slurry passing through the recirculating loop; and attaining the desired density in the slurry passing out the discharge conduit by continuing to recirculate slurry from the secondary tank to the mixing bowl while adjusting the entering flow of dry cement and water entering the mixing bowl based upon the density measurement taken from the primary tank.

8. An apparatus for mixing dry cement and water to form a well cementing slurry, comprising:

a mixing module including a cement hopper, a mixing bowl, and an inlet stream of pressurized water for initially mixing cement discharged from the hopper into the mixing bowl to form a cement slurry;

a primary tank connected to the mixing module by a conduit whereby slurry from the mixing module passes to the primary tank, the primary tank being equipped with a spillway which allows overflow into a larger capacity, secondary tank;

a first recirculating loop connected to the primary tank and including a recirculating pump for recirculating a portion of the slurry contained in the primary tank through the loop and back to the primary tank under pressure to fur her mix the slurry in the primary tank;

a discharge conduit leading from the secondary tank to a high pressure pump and from the high pressure pump to the well bore;

a vertical auger mounted in the secondary tank for agitating the slurry contained in the secondary tank to reduce air entrainment and further mix the slurry;

a second recirculation loop connecting the secondary tank with the mixing module and including a pump for recirculating a portion of the slurry contained in the secondary tank to the mixing module where it combines with the stream of water and cement entering the mixing module; and a densimeter located in the first recirculating loop for measuring the density of the slurry contained in the primary tank by reading the density of the slurry passing through the first recirculating loop, the desired density being attained in the slurry exiting through the discharge conduit by continuing to recirculate slurry from the secondary tank to the mixing bowl while adjusting the entering flow of dry cement and water entering the mixing bowl based upon the density measurement taken from the primary tank.

* * * * *